US005692068A

United States Patent [19]

Bryenton et al.

[11] Patent Number: 5,692,068

[45] Date of Patent: Nov. 25, 1997

[54] PORTABLE HAND-HELD BANKNOTE READER

[75] Inventors: E. L. Bryenton, 1800 Dorset Drive, Ottawa, Ontario, Canada, K1H 5T8; David A. Brulé, Nepean; Alan L. Bryenton, Ottawa, both of Canada

[73] Assignee: E. L. Bryenton, Ottawa, Canada

[21] Appl. No.: 555,892

[22] Filed: Nov. 15, 1995

Related U.S. Application Data

[63] Continuation-in-part of Ser. No. 263,785, Jun. 20, 1994, abandoned, which is a continuation of Ser. No. 72,645, Jun. 7, 1993, abandoned, which is a continuation of Ser. No. 722,516, Jun. 27, 1991, abandoned.

[51] Int. Cl.$^6$ .......... G06K 9/00

[52] U.S. Cl. .......... 382/135; 382/313; 434/116

[58] Field of Search .......... 382/114, 135, 382/218, 313, 324; 340/825.3, 825.34; 395/2.8; 434/112, 116; 356/71

[56] References Cited

U.S. PATENT DOCUMENTS

| | | | |
|---|---|---|---|
| 4,179,685 | 12/1979 | O'Maley | 340/146.3 H |
| 4,288,781 | 9/1981 | Sellner et al. | 340/146.3 Q |
| 4,442,541 | 4/1984 | Finkel et al. | 382/7 |
| 4,464,787 | 8/1984 | Fish et al. | 382/7 |
| 4,487,306 | 12/1984 | Nao et al. | 194/4 C |
| 4,490,846 | 12/1984 | Ishida et al. | 382/7 |
| 4,539,702 | 9/1985 | Oka | 382/7 |
| 4,563,771 | 1/1986 | Gorgone et al. | 382/7 |
| 4,611,345 | 9/1986 | Ohnishi et al. | 382/7 |
| 4,803,737 | 2/1989 | Sato et al. | 382/65 |
| 4,817,185 | 3/1989 | Yamaguchi et al. | 382/59 |
| 4,823,393 | 4/1989 | Kawakami | 382/7 |
| 4,984,280 | 1/1991 | Abe | 382/7 |
| 5,008,521 | 4/1991 | Ohki et al. | 235/454 |
| 5,014,325 | 5/1991 | Morimoto | 382/7 |
| 5,020,110 | 5/1991 | Chominski | 382/7 |
| 5,199,543 | 4/1993 | Kamagami et al. | 194/207 |

OTHER PUBLICATIONS

"Note Teller by Brytech," Brytech brochure, no publication date (received PTO mailroom Jun. 20, 1994).

"NoteTeller: The Bank Note Reader for Blind and Visually Impaired People," Brytech brochure, no publication date (received PTO mailroom Jun. 20, 1994).

*Primary Examiner*—Andrew Johns

[57] ABSTRACT

A method and apparatus of reading bank notes is provided comprising storing signals in a memory. The imaging apparatus for scanning a stationary banknote includes a stationary light source, mirror, charge coupled device (CCD), and lens. The method corresponding to at least a portion of an array of pixels defined by a printed pattern on the face of a bank note, raster scanning the face of the bank note with a charge coupled device (CCD) to obtain a serial signal representing the pattern, searching the memory for the serial signal, comparing the serial signal with the stored signals, and indicating the correct presence of the bank note in the event the comparison correlates to a predetermined degree.

13 Claims, 5 Drawing Sheets

PORTABLE HAND-HELD BANKNOTE READER

This application is a Continuation-in-Part of application Ser. No. 08/263,785 filed Jun. 20, 1994, now abandoned, which is a Continuation of application Ser. No. 08/072,645 filed Jun. 7, 1993, now abandoned, which is a continuation of application Ser. No. 07/722,516 filed Jun. 27, 1991, now abandoned.

FIELD OF THE INVENTION

This invention relates to a portable hand-held bank note reader.

BACKGROUND OF THE INVENTION

Bank note readers and readers of material carrying expected indicia have in the past used photosensors to detect the density of the print or markings at base points on a target object such as a bank note, and have compared the density with stored density data for the particular base points. These readers have served satisfactorily for their intended function, however, there is a need for a lightweight, reliable, portable hand held unit that will allow visually impaired persons to correctly identify banknotes.

A typical bank note reader, as described in Canadian Patent 1,282,171 issued Mar. 26th, 1991 to E. L. Bryenton & Associates Inc., uses 8 photocells which are located at specific base point positions over an illuminated symmetrically coded bank note. The print density is determined by the photocells, which transmit their signals to individual comparators. The comparators compare the signals from the photocells with reference voltages, and the result is applied to an arbitrator. Correct comparisons of a valid coding on both ends of the note detected by the arbitrator result in "correct bank note" indication signals output from the arbitrator. These signals can be sent to a bank note accept relay, or the like, to facilitate the provision of change, the vending of a product, etc.

With legal bank notes having increased resolution of print and with the use of other means to alert vendors to the legality of bank notes, such as by the use of holographic images on bank notes, the bank note reader described above has proven to be limited in its capability.

SUMMARY OF THE INVENTION

The present invention overcomes most or all of the deficiencies of the bank note reader described in the above-noted patent. Rather than detecting the density of only 8 locations on a bank note as in the above-noted patent, in a preferred embodiment specific coding of 31,680 pixel sensors within a given area are used, and the bank note or part of the bank note is scanned with these sensors in an imager. The result is a high resolution electronic scanning of the bank note.

The resulting signal is digitized and is compared with pattern information signals stored in a memory. The detection of a match between the scanned image and the stored image signals results in the output of a signal which can cause the announcement of the value of the bank note, the provision of a digital signal to a change maker, a vending machine acceptor, a video display, a tactile interface, etc.

With the high resolution of the imager, and the prestorage of desired images with equivalent resolution in a memory, a bank note reader of high accuracy for fine printed bank notes, including those carrying holographic images can be produced.

Indeed due to the high resolution of the reader, it can be used to read other printed and signature material including graphics, alphanumeric and other coded inscriptions. Aside from providing visually impaired persons with a means for determining the denomination of a particular banknote, the device in accordance with this invention can also be used as a reader for the blind, reading letters or words and after finding the letters or words in the memory, generating an acoustic signal such as letter or word sounds for reproduction in a loudspeaker. However, for ease of description, in this disclosure the embodiment described will be restricted to the bank note reader application. A person skilled in the art could easily adapt the design, using the principles described, to such other applications as noted above.

According to an embodiment of the invention, a hand-held portable battery-powered banknote reader is provided that comprises means for storing signals in a memory corresponding to at least a portion of a pattern of pixels defined by indicia expected to be carried on the face of a banknote, stationary means for imaging a stationary banknote and providing output signals, means for comparing groups of said output signals with said stored signals, and means for indicating the presence of said banknote in the event a comparison is correct above a predetermined level of error.

According to another aspect of the invention a method is provided of reading banknotes comprising the steps of storing signals in a memory corresponding to plural arrays of pixels, each array defined by a different printed pattern in a restricted area on the face of each of plural different denomination banknotes and each array corresponding to a single banknote denomination, raster scanning by imaging a stationary image on a stationary CCD, a restricted area of the face of a banknote to obtain a serial signal representing one of said patterns, searching the memory for said serial signal, comparing said serial signal with groups of said stored signals which define plural ones of said patterns using a best fit analysis to find a best fit match of said serial signal to a signal group of stored signals corresponding to a denomination of a banknote, and defining the correct denomination of a banknote of a kind of carrying a pattern specific to a particular denomination based only on said best fit match of said pattern with said signal group of stored signals from stored signals relating to all denominations, in the event the comparison correlates to one of said patterns to a predetermined degree.

BRIEF DESCRIPTION OF THE DRAWINGS

Exemplary embodiments of the invention will now be described in conjunction with the following drawings, in which.

DETAILED DESCRIPTION

Figure 1A:
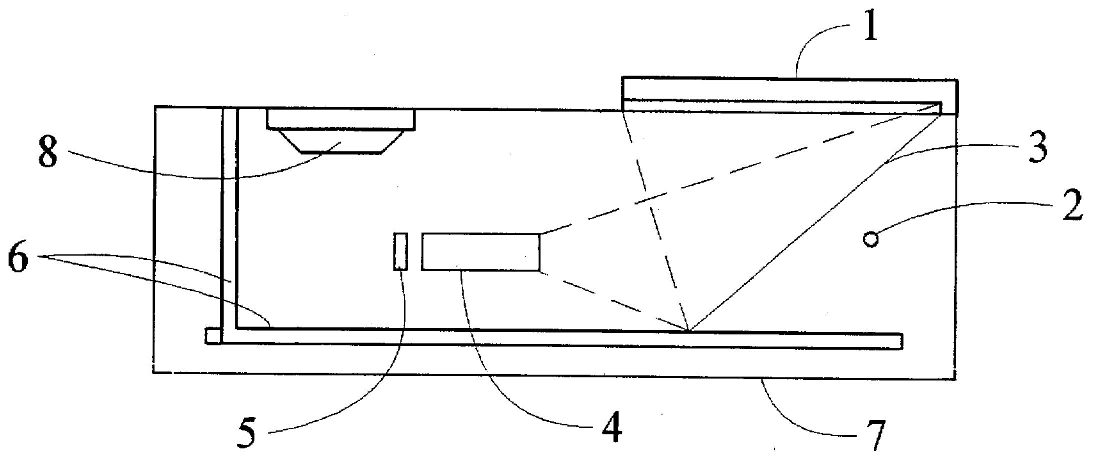
FIG. 1*a* is a cross-section of a physical layout of a bank note reader in accordance with an embodiment of the present invention.

The configuration and operation of the hand-held reader shown in FIG. 1*a* will now be described. A banknote 1 is slid along the top of a portable reader 7 until it reaches the end when an activation switch energizes the reader, illuminates the bank note 1 with a light source in the form of light emitting diodes 2 and at the same time energies the fixed CCD 5 and electronic circuit including a microprocessor (not shown) mounted to a printed circuit board 6. The light from the image is reflected from a mirror 3 and is passed through an optical fixed lens 4, focusing a portion of the note image on the energized CCD 5; the CCD 5 captures the stationary projected image on its pixels, each with an electrical charge in proportion to the darkness in the gray scale of the image. This visual image is thus converted to an electrical image where it is digitized, processed, and compared to all images in its memory and then produces a tactile or audio output 8 announcing the results after comparing the captured image of the note and the stored images in its memory. All operations are controlled by the reader's microprocessor. In this embodiment the light emitting diodes (LEDs) 2 are positioned behind the mirror 3 that is half silvered, allowing light from the LEDs to pass therethrough to illuminate the banknote 1.

Figure 1B:
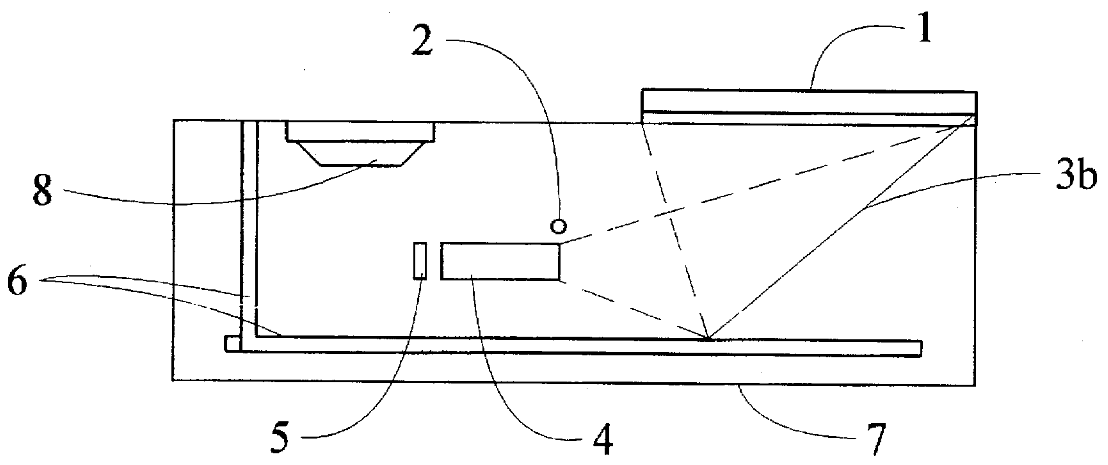
FIG. 1*b* is a cross-section of a physical layout of a bank note reader in accordance with an alternative embodiment of the present invention.

Alternatively, in a preferred embodiment shown in FIG. 1*b*, a nearly 100% reflecting standard mirror 3*b* is used and the LEDs 2 are fixed adjacent the lens holder so that light emitting from the LEDs is reflected by the fixed mirror 3*b* to illuminate at least a portion of the stationary banknote.

This invention illustrated in FIGS. 1*a* and 1*b*, advantageously has no moving parts and therefore provides a device that is robust, durable, and longlasting. As is evident when viewing FIGS. 1*a* and 1*b*, the CCD array 5 is disposed in a predetermined fixed relationship with respect to the fixed lens 4 and the mirror, so that a stationary banknote that has activated the energizing switch is imaged upon the stationary CCD array. The invention enables visually impaired people to independently denominate bank notes with a reader that is hand held, fits in a pocket, is accurate and reliable by applying the design concepts as described herein.

Figure 2:
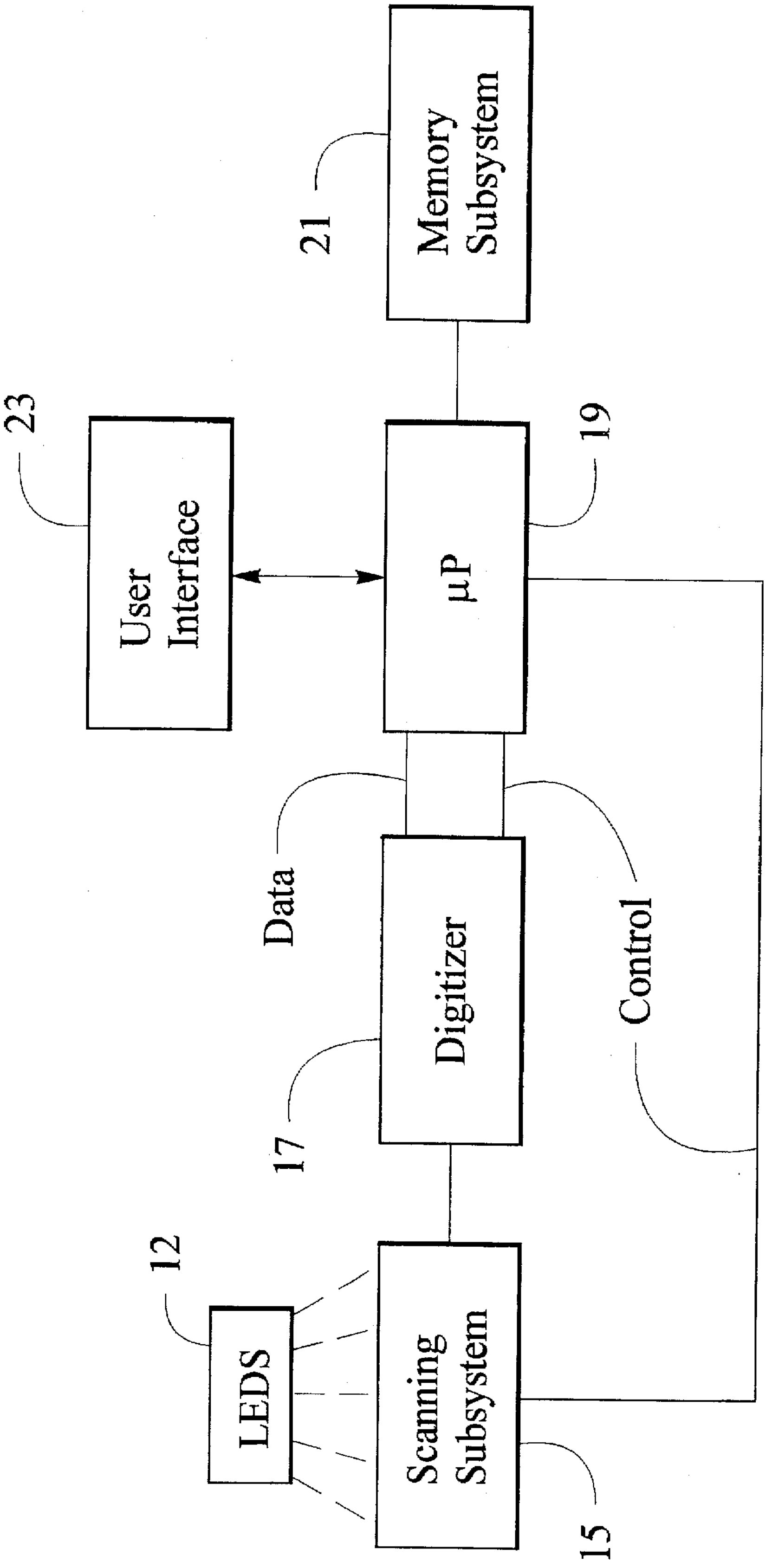
FIG. 2 is a block diagram of a bank note reader in accordance with an embodiment of the present invention.

A block diagram of the circuit is shown in FIG. 2. The CCD is connected in a raster scanning or imaging subsystem 15. The signal output of the CCD 5 in a subsystem 15 is connected to the input of a digitizer 17 which has its output connected to the bus of a microprocessor 19. Also connected to the microprocessor is a memory subsystem 21 in one successful prototype formed of an 8 Kbyte scratch pad memory and a 128 Kbyte erasable programmable read only memory (EPROM).

Also connected to the processor by means of a bus is a user interface 23, which can be comprised of one or more of a bank note receiver, a voice synthesizer and speaker, a display etc.

Data signals corresponding to patterns on the faces of legitimate bank notes or parts of bank notes are stored in the EPROM of the memory subsystem. When a bank note is moved into the slot of a bank note receiver in the user interface, it triggers a microswitch (not shown) or interrupts a light beam received by a photocell when it assumes a reading position as shown in FIG. 1. It should be noted that in contrast to the bank note reader of the prior art, this position need not be accurate. In the past, inaccurate positioning would result in reading of points on the bank note which were incorrect and off the intended base points, which would result in the rejection of a legal bank note. This does not occur or at least is minimized in the present invention.

Operation of the microswitch upon the entry of a bank note to the reading position causes the microprocessor to be triggered, starting a reading cycle. The processor, by a link to the scanning subsystem 15, causes the illumination of the object. The reflected light from the bank note is focused on the CCD 5. At the same time the CCD 5 is rapidly electronically read to provide a raster scanned electronic signal output. As a typical CCD preferred to be used has 31,680 pixels, the raster scanned serial output signal from the CCD results having a horizontal resolution of about 200 pixels, with as many shades of grey as the CCD and driving circuitry is capable of.

The output signal is applied to the digitizer/comparator 17. The digitized signal is also received by the microprocessor 19, which stores at least portions of the received signal, resulting from a portion of the image of the face of the object in the scratch pad memory in memory subsystem 21, and performs best fit search attempts to locate the portions of the image from the EPROM, as will be described below.

Pattern recognition algorithms such as were developed by the Department of Communications of the Government of Canada and Copyright registered in 1990, were used in a successful prototype of this invention, although other algorithms which can perform the method described herein may be used.

When a match of the signals in the scratch pad memory has been found to a stored pattern signals, the microprocessor operates the user interface to provide a synthesized voice indication of the denomination of the bank note or of a rejection and/or a signal to a vending machine acceptor mechanism, etc.

Figure 3:
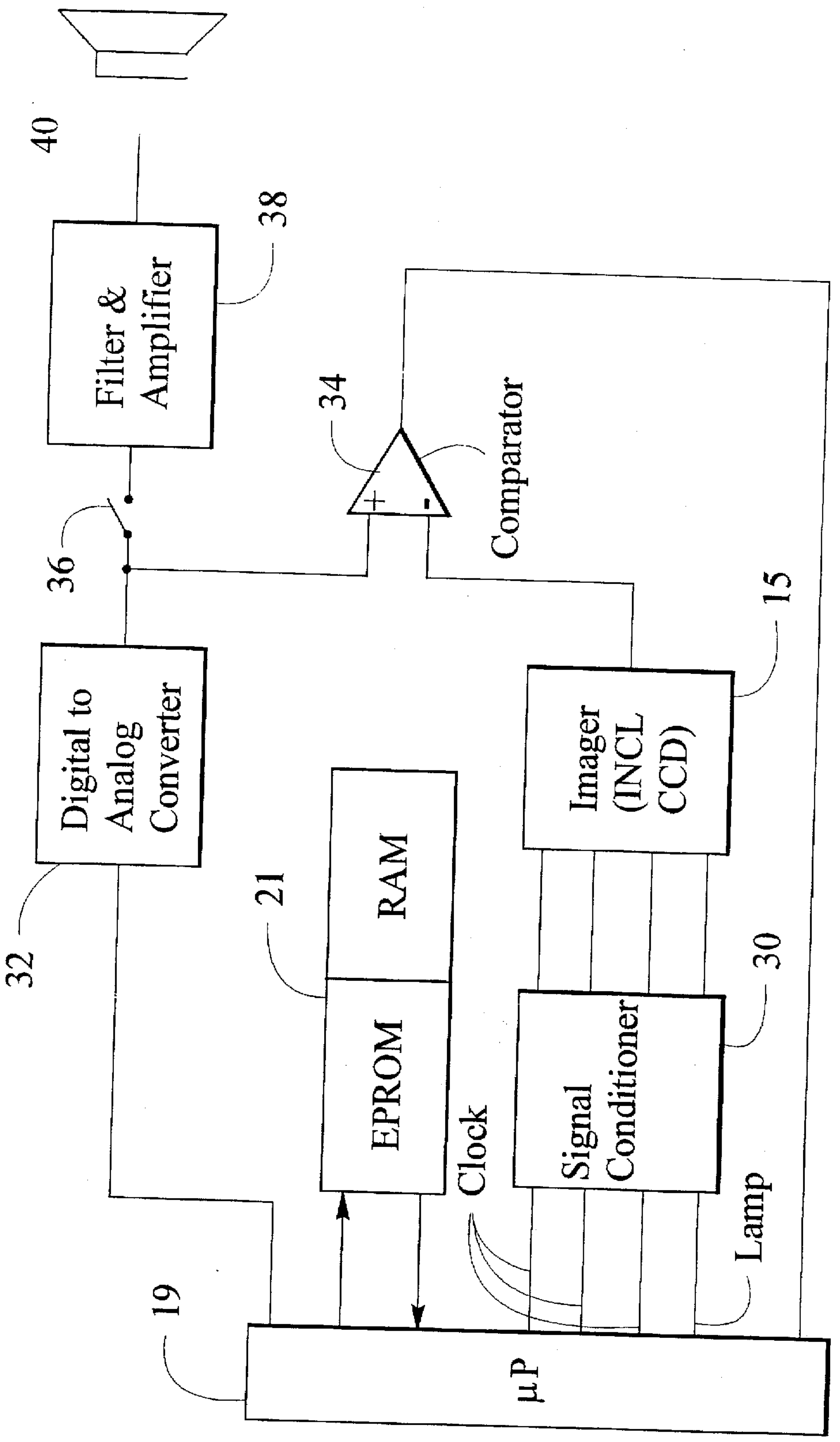
FIG. 3 is a more detailed block diagram of a bank note reader in accordance with an embodiment of the present invention.

FIG. 3 is a more detailed block diagram of the electronic portion of the invention. The CCD and lens imaging subsystem 15 (which can be referred to as an imaging system) is connected to the microprocessor 19 through a signal conditioner 30. A microprocessor that can be used to implement the invention is type 80C31. Also connected to the microprocessor 19 is the 128K EPROM and 8K RAM, in memory subsystem 21.

Connected to the microprocessor is a digital to analog converter 32, having its output connected to one input of a comparator 34. The other input of the comparator 34 is connected to the output of the CCD 15. The output of the comparator is connected to an input of microprocessor 19.

The output of the digital to analog converter is also connected through an electronic switch 36 to the input of an audio filter and amplifier 38, which has its output connected to a loudspeaker 40. Of course in the application of a reader for the blind or for others, the speakers can be replaced by a tactile device or other suitable output device.

In operation, after being triggered to start a cycle, the microprocessor 19 applies signals to the imaging system and clock signals to the CCD 15, which signals are conditioned in signal conditioner 30 to shapes which will drive the CCD and imaging system error free. In addition, the LED driving power is applied to the LED array 2. As a result a raster scan output signal from the CCD 5 corresponding to the image printed on the face of the bank note appears at an input of comparator 34. The other input of the comparator 34 is supplied with d.c. from the digital to analog converter 32. The output signal of comparator 34 is thus a pixel by pixel sequence representation of the face of the bank note, which output signal is provided to microprocessor 19.

When the comparator is to be inhibited, an opposite polarity d.c. signal is presented to the input of the comparator 34 from digital to analog converter 32, under control of microprocessor 19.

The microprocessor 19 stores serial sequences of the pixel by pixel representation in the RAM portion of memory 21, and accesses such portions, comparing them with patterns of data signals corresponding to correct pixel pattern representations stored in the EPROM. When it has found such a match, finding successive serial pixel sequences that correlate in the correct locations (in the correct sequence) with what is stored in the EPROM, the microprocessor can signal a correct comparison. Since there are normally several different denominations of bank note pixel sequence representations stored in the EPROM, the processor can signal the one that correlates most closely. The microprocessor then outputs a signal via digital to analog converter 32 indicating the denomination, or, if a time out or predetermined number of vertical scans have resulted in no correct bank note correlation findings, a signal is generated which rejects the bank note 1.

In order to provide a voiced indication to the user as to the denomination or rejection, the processor locates a signal to synthesize a predetermined word or sequence of words in the EPROM corresponding to the aforenoted result of the memory search, enables the closing of switch 36, and outputs the synthesized digital signal to digital to analog converter 32. This signal is converted to analog form in converter 32, is passed through filter and amplifier 38, and is reproduced as an audio signal in speaker 40, thus informing the user of the acceptance and/or its denomination or rejection of the bank note.

Figure 4A:
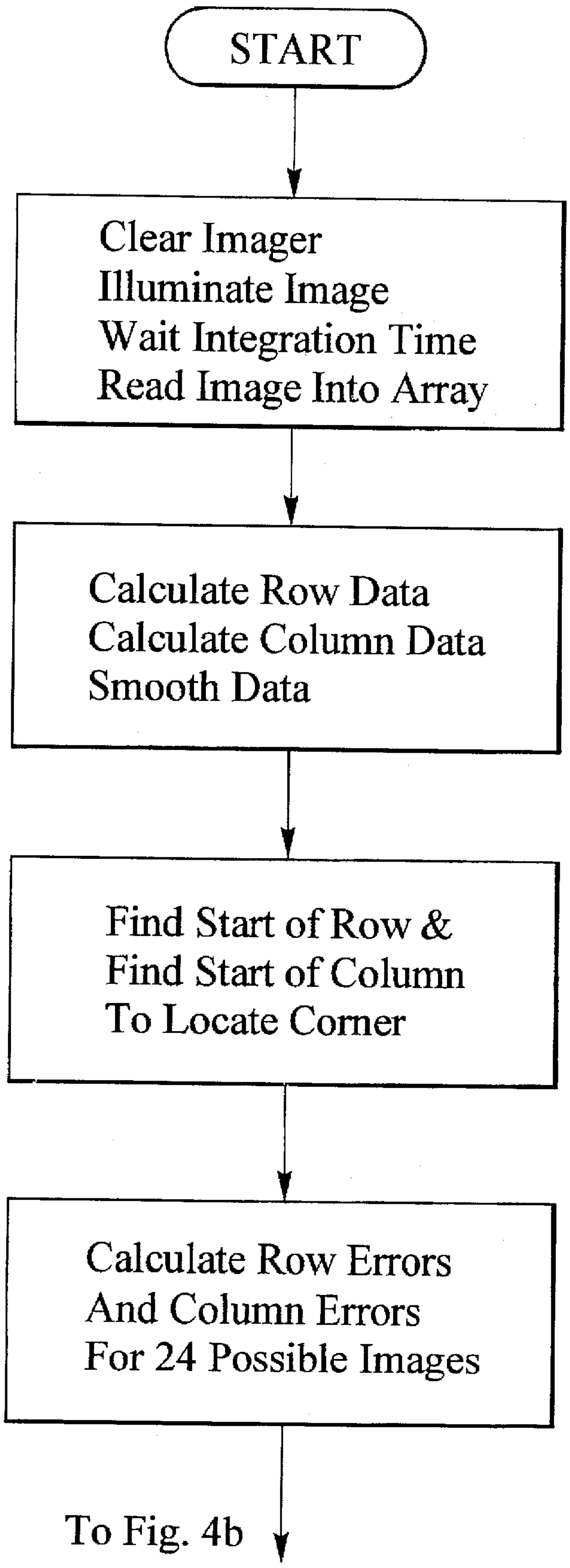
FIGS. 4A and 4B together, with FIG. 4A above FIG. 4B, form a flow chart describing how the microprocessor in an embodiment of the present invention operates to perform the correlation function described.
Figure 4B:
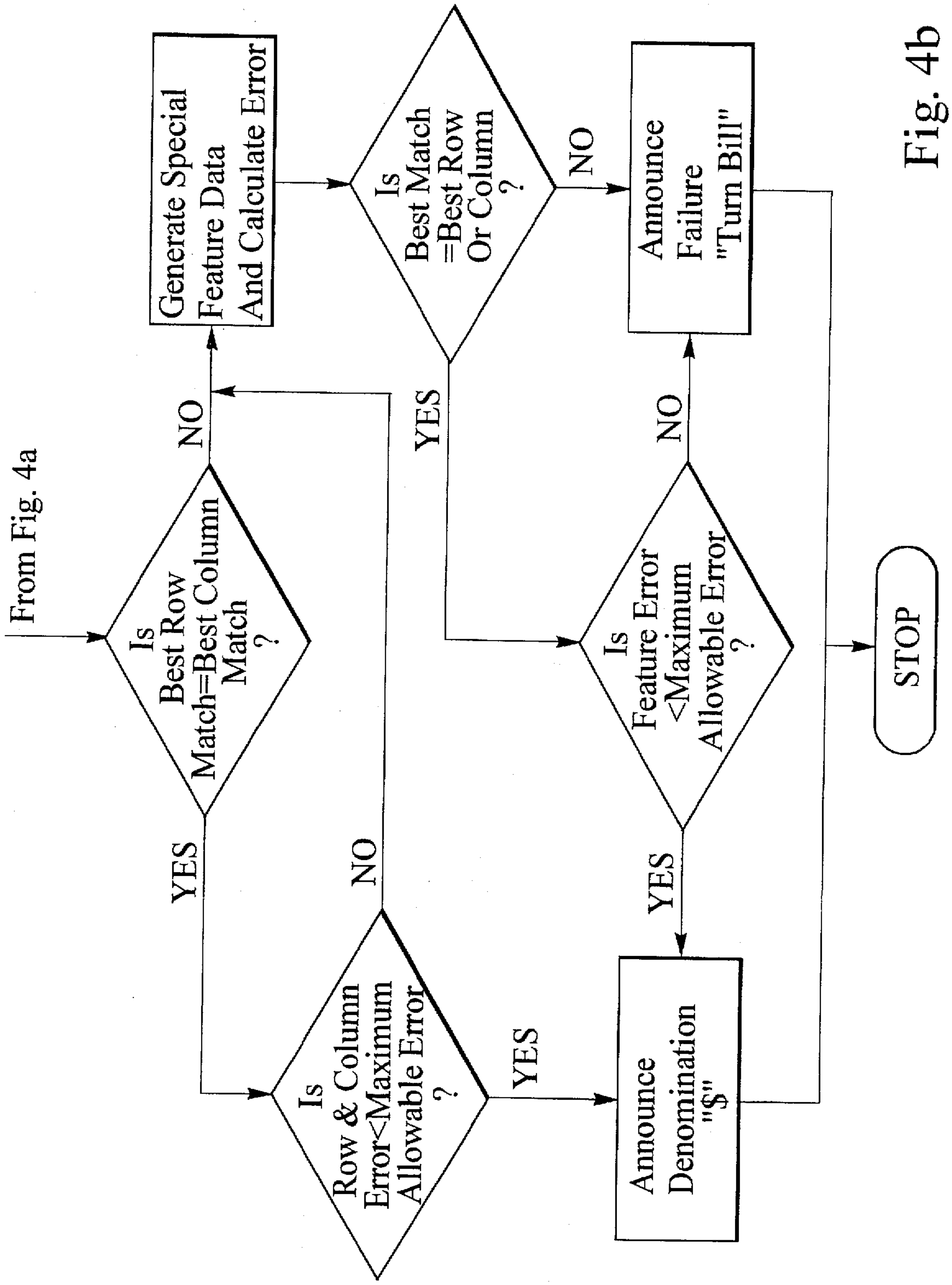

FIGS. 4A and 4B placed together with FIG. 4A above FIG. 4B, form a flow chart describing operation of the microprocessor 19 processing the data from the CCD. Once the cycle has been enabled by triggering by the bank note sensing microswitch, the microprocessor clears the CCD imager. It then causes illumination of the image by the LEDs, and waits for the CCD image integration time. The image is then read into the array.

The output of the CCD is received by the microprocessor after digitization, the row and column data is calculated and the result smoothed by means of a digital algorithmic filter, the result stored in the RAM. The start of the rows and columns are then digitally located to locate a corner position of the scanned image. Row and column errors are then calcualated, for example 24 scans of the image.

The EPROM is then accessed to find the best row and best column match. If one is found, the number of errors of the read CCD data from the memory row and column data is determined, and if the number of errors is smaller than a predetermined maximum, the voice synthesizing signal for generating a denomination accept announcement is retrieved from the EPROM and sent to the loudspeaker as described above.

If there is no match found, or if the error rate described above is too high, a comparison is made of the pixel sequence data with special feature data stored in the EPROM, such as defining a holographic image. The best match is determined and if the feature error rate is below a predetermined maximum, the denomination accept step is followed, as described above. If there is no match of the special feature, or if the error rate is too large, a synthesized announcement signal is retrieved from the EPROM to announce acoustically in a manner as described above such as “cannot read”.

Once the above sequence has been concluded with an acoustic signal (and/or a signal to a vending machine, change maker, etc. to accept the bill), the cycle is concluded and the microprocessor waits for the next trigger signal to repeat the cycle.

A person understanding this invention may now conceive of alternative structures and embodiments or variations of the above. All of those which fall within the scope of the claims appended hereto are considered to be part of the present invention.

What we claim is:

1. A hand-held portable banknote reader comprising:

means for storing signals in a memory, said signals corresponding to at least a portion of a pattern of pixels defining indicia expected to be carried on the face of a banknote;

slot means for guiding the banknote into a stationary reading position;

sensing means for automatically detecting the presence of a banknote in said stationary reading position;

stationary means responsive to the detection of the banknote by said sensing means for imaging at least a portion of the banknote in said stationary reading position and providing output signals;

means for comparing groups of said output signals with said stored signals; and means for indicating the presence of a valid banknote in the event a comparison is correct above a predetermined level of error.

2. A hand-held portable banknote reader as defined in claim 1, wherein the stationary imaging means is comprised of a stationary CCD, a stationary lens, and a stationary mirror for imaging at least a portion of a pattern on a face of the banknote through the fixed lens and onto the CCD.

3. A hand-held portable banknote reader as defined in claim 2 including an array of light emitting diodes for illuminating said face of the banknote, whereby reflected light from said face is received by said CCD.

4. A hand-held portable banknote reader as defined in claim 3 wherein the array of light emitting diodes is disposed at a reflecting side of the fixed mirror to allow light from the light emitting diodes to reflect from the reflecting side of the mirror to illuminate said face of the banknote.

5. A hand-held portable banknote reader as defined in claim 2 including means for electronically raster scanning said face, whereby an output signal can be produced by said CCD which corresponds to a sequence of pixels related to the pattern of said indicia over at least a portion of said face.

6. A hand-held portable banknote reader as defined in claim 5 in which said indicating means is comprised of a voice synthesizer means, an audio filter and amplifier and electro-acoustic translation means for announcing the denomination of a banknote.

7. A hand-held portable banknote reader as defined in claim 5 in which said memory means stores a plurality of signals corresponding to patterns on the surface of banknotes in which said banknotes are different.

8. A hand-held portable banknote reader as defined in claim 7 in which said indicating means is comprised of a voice synthesizer means, an audio filter, amplifier and electro-acousto translation means for announcing the presence of a banknote or the lack of presence of a banknote.

9. A hand-held portable banknote reader as defined in claim 5 in which said memory means stores a plurality of signals each corresponding to at least a different portion of an array of indicia relating to a banknote.

10. A hand-held portable banknote reader as defined in claim 9 in which said indicating means is comprised of a voice synthesizer means, an audio filter, amplifier and electro-acousto translation means for announcing the presence of a banknote or the lack of presence of a banknote.

11. A hand-held portable banknote reader as defined in claim 1, wherein the reader is powered by a battery.

12. A method of reading banknotes comprising the steps of:

storing signals in a memory, said signals corresponding to plural arrays of pixels, each array defining a different printed pattern in a restricted area on the face of each of plural different denomination banknotes and each array corresponding to a single banknote denomination;

guiding the banknote into a stationary reading position using a slot means;

automatically detecting the presence of a banknote in said stationary reading position;

in response to the detection of the banknote in said reading position, electronically raster scanning, by imaging a stationary image on a stationary CCD, a restricted area of the face of the banknote to obtain a serial signal representing on of said patterns;

searching the memory for said serial signal, comparing said serial signal with groups of said stored signals which define plural ones of said patterns using a best fit analysis to find a best fit match of said serial signal to a signal group of stored signals corresponding to a denomination of a banknote; and defining the correct denomination of a banknote of a kind carrying a pattern specific to a particular denomination based only on said best fit match of said pattern with said signal group of stored signals from stored signals relating to all denominations, in the event the comparison correlates to one of said patterns to a predetermined degree.

13. A hand-held, portable, banknote reader comprising:

means for storing signals in a memory, said signals corresponding to plural patterns of pixels relating to different banknote denominations, each pattern relating to a restricted area of a corresponding different banknote defining indicia expected to be carried on the face of the a valid banknote;

slot means for guiding the banknote into a stationary reading position;

sensing means for detecting the presence of a banknote in said stationary reading position;

a stationary mirror for directing an image corresponding to a restricted area of the banknote to a fixed lens;

a stationary semiconductor charge coupled device (CCD) responsive to the detection of the banknote by said sensing means for electronically scanning an image provided by the lens and providing output signals that correspond to the image;

means for searching the memory for said output signals, for comparing groups of said output signals with plural groups of stored signals which define plural ones of said patterns for defining a particular banknote denomination resulting directly from a best fit analysis match of said output signals to one of said groups of stored signals relating to a particular banknote denomination; and means for indicating the defined particular denomination of banknote based only on said best fit analysis match of said pattern with a group of stored signals from stored signals relating to all denominations.

* * * * *